United States Patent
Haegdorens et al.

(10) Patent No.: US 9,979,660 B2
(45) Date of Patent: May 22, 2018

(54) METHOD FOR AN AUTOMATIC SELECTION OF AN IP QOS MECHANISM, RESPECTIVE CPE DEVICE AND COMPUTER READABLE STORAGE MEDIUM

(71) Applicant: THOMSON LICENSING, Issy les Moulineaux (FR)

(72) Inventors: Davy Haegdorens, Tessenderlo (BE); Stein Heselmans, Nijlen (BE)

(73) Assignee: Thomson Licensing, Issy-les-Moulineaux (FR)

(*) Notice: Subject to any disclaimer, the term of this patent is extended or adjusted under 35 U.S.C. 154(b) by 1 day.

(21) Appl. No.: 15/106,306

(22) PCT Filed: Dec. 11, 2014

(86) PCT No.: PCT/EP2014/077350
§ 371 (c)(1),
(2) Date: Jun. 19, 2016

(87) PCT Pub. No.: WO2015/091195
PCT Pub. Date: Jun. 25, 2015

(65) Prior Publication Data
US 2017/0005940 A1   Jan. 5, 2017

(30) Foreign Application Priority Data
Dec. 19, 2013   (EP) ................... 13306785

(51) Int. Cl.
*H04L 12/851*   (2013.01)
*H04M 11/06*   (2006.01)
*H04L 12/26*   (2006.01)
*H04L 12/64*   (2006.01)
*H04M 3/00*   (2006.01)

(52) U.S. Cl.
CPC .......... *H04L 47/24* (2013.01); *H04L 43/0894* (2013.01); *H04L 43/16* (2013.01); *H04M 11/062* (2013.01); *H04L 2012/6478* (2013.01); *H04M 3/007* (2013.01)

(58) Field of Classification Search
CPC ...... H04L 47/24; H04L 43/0894; H04L 43/16
See application file for complete search history.

(56) References Cited

U.S. PATENT DOCUMENTS 7,539,199 B2   5/2009   Shrimali et al.
7,710,989 B2   5/2010   Chew
(Continued)

OTHER PUBLICATIONS

Anonymous, "Home Gateway Initiative", HGI Guideline Document: QoS white paper, HGI-GD013-R2, Jun. 26, 2009, pp. 1-31.
(Continued)

*Primary Examiner* — Siming Liu
(74) *Attorney, Agent, or Firm* — Myers Wolin LLC

(57) ABSTRACT

The method for an automatic selection of a quality of service queuing mechanism for upstream traffic on a high bandwidth access line comprises the steps of measuring the upstream rate (1) on the access line (10), and depending on that rate (20), keeping a software queuing mechanism enabled in case of an upstream rate below a defined threshold (S) (30), and disabling the software queuing mechanism in case of an upstream rate above the defined threshold (40).

15 Claims, 2 Drawing Sheets

(56) References Cited

U.S. PATENT DOCUMENTS

| | | |
|---|---|---|
| 7,974,208 B2 | 7/2011 | Brewer et al. |
| 2012/0033684 A1* | 2/2012 | Mosko ............. H04W 72/1263 370/503 |
| 2012/0155264 A1 | 6/2012 | Sharma et al. |

OTHER PUBLICATIONS

Draft ETSI Standard ETSI TS 102 973 v<0.3>, "Network Termination (NT) in Next Generation Network Architectitres",V0.3, Feb. 2008, pp. 1-39.

Grossman, D., "New Terminology and Clarifications for Diffserv", Network Working Group Request for Comments 3260, Apr. 2002, pp. 1-10.

Anonymous, "IEEE P802.1p", Wikipedia, https://en.wikipedia.org/wiki/IEEE_P802.1p, Jul. 23, 2015, pp. 1-2.

Anonymous, "Broadcom&aposs Single-Chip VDSL2/ADSL2+ Multimode Residential Gateway Solution Enables Next Generation Telecom Networks", Linux Magazine, Sep. 29, 2008, pp. 1-3.

* cited by examiner

METHOD FOR AN AUTOMATIC SELECTION OF AN IP QOS MECHANISM, RESPECTIVE CPE DEVICE AND COMPUTER READABLE STORAGE MEDIUM

This application claims the benefit, under 35 U.S.C. § 365 of International Application of PCT/EP2014/077350, filed Dec. 11, 2014, which was published in accordance with PCT Article 21(2) on Jun. 25, 2015, in English, and which claims the benefit of European patent application No. 13306785.0, filed Dec. 19, 2013.

TECHNICAL FIELD

The invention relates to the field of customer-premises equipment devices coupled to an IP (Internet Protocol) network, e.g. via a digital subscriber line to a network service provider.

BACKGROUND OF THE INVENTION

Residential gateways are widely used to connect devices in the home to the Internet or any other wide area network (WAN). Residential gateways use in particular digital subscriber line (DSL) technology that enables a high data rate transmission over copper lines or optical lines. During the years, several DSL standards have been established, differing in data rates and in range, for example ADSL and VDSL, which are referred to in this context as xDSL. Also optical transmission for Internet services is well known, for example fiber-to-the-home (FTTH) and fiber-to-the-premises (FTTP). Residential gateways, but also other devices such as routers, WLAN (Wireless Local Area Network) forwarders, switches, telephones and set-top boxes, are understood in this context as customer premises equipment (CPE) devices.

IP QoS (Internet Protocol Quality of Service) mechanisms are implemented in integrated circuits as a hardware mechanism, but some more flexible mechanisms are implemented in software. IPQoS is defined, for example, in IEEE P802.1p, which describes eight different classes of service. RFC 3260 describes Differentiated Services (DiffServ), a mechanism for classifying and managing network traffic and providing quality of service on IP networks.

The subject is upstream QoS management on VDSL implemented through queuing mechanisms. On the Broadcom 6368 platform, which is a low-power VDSL and ADSL2+ IC solution for a residential gateway, a limited queuing mechanism is implemented in hardware. Queues can be configured to work in a strict mode or in a WRR (weighted round robin) mode. A combination of both queuing mechanisms is not possible.

Software (IPQoS, AQM (Active Queue Management)) queuing is implemented to allow for more advanced queuing mechanisms. Queues can be configured to have strict mode and WRR mode (e.g. 2 queues strict+2 queues WRR). Also more advanced features (tcp ack filtering, shaping, etc) are implemented in this software module.

To serve a VDSL upstream QoS feature, the IPQoS software module is configured with some combination of queue settings. A mapping is configured in the hardware queues to make sure that the software queues are extended in hardware (with limited feature set).

Drawback of this software module is that it consumes a lot of CPU resources (CPU load+memory usage). This becomes a problem in particular when the upstream synchronization rate on a VDSL line is high (above ~10 Mbps). As the upstream rate is higher, the queuing mechanism is allowed to transfer more packets per second, which leads to more work for the processor and more CPU load.

It is possible to disable or enable this feature through the configuration interfaces, but that would require manual monitoring of the end customers upstream rate, and deciding to enable or disable the software queuing. This is hard to manage.

Another solution could be to deploy two kinds of software to end customers: one with software queuing enabled, the other one with software queuing disabled. This is even harder to manage.

SUMMARY OF THE INVENTION

The method for an automatic selection of a quality of service (QoS) queuing mechanism for upstream traffic on a high bandwidth access line comprises:
measuring the upstream rate on the access line, and depending on that rate, deciding to keep a software queuing mechanism enabled in case of an upstream rate below a defined threshold, and disabling the software queuing mechanism in case of an upstream rate above the defined threshold.

In particular, a hardware queuing is enabled up to a maximum synchronization rate, and the software queuing is only enabled up to the threshold. The hardware queuing is hence used as a fallback solution in case the software queuing is not enabled.

In a preferred embodiment, the method uses a weighted round robin priority queuing as the software queuing and a strict priority queuing for the hardware queuing, in case the upstream rate is below the threshold, and disables the weighted round robin priority queuing when the upstream rate is above the threshold. The queues, as used for the weighted round robin priority queuing, are advantageously combined into one queue when the software queuing is disabled.

In another embodiment, the high bandwidth access line is an xDSL line, for example a VDSL line.

The customer premises equipment device comprises a microprocessor for performing the method. The customer premises equipment (CPE) device is in particular a residential gateway, an enterprise gateway, a router, a switch, or a set-top box.

The computer readable storage medium includes stored instructions enabling the microprocessor of the CPE device to perform the method.

The method therefore measures the upstream rate on the access line, in particular the upstream synchronization rate, or upstream data rate in Mbit/s. And depending on that rate, it decides to keep the software queuing enabled, e.g. for low synchronization rates, or to disable the software queuing, e.g. for high synchronization rates. When the method decides to disable the software queuing, there still is the hardware queuing, with a limited QoS feature set, as a fallback solution. As QoS is less important on higher rates, it isn't a big issue to fallback to a limited feature set. The method is, for example, implemented in an automatic configuration script or in a generic CPE software of the CPE device.

BRIEF DESCRIPTION OF THE DRAWINGS

Preferred embodiments of the invention are explained in more detail below by way of example with reference to schematic drawings, which show.

DETAILED DESCRIPTION OF PREFERRED EMBODIMENTS

In the following description, example methods for an automatic selection of an IP QoS (quality of service in an IP network) mechanism for upstream traffic on a high bandwidth access line are described. For purposes of explanation, various specific details are set forth in order to provide a thorough understanding of preferred embodiments. It will be evident, however, to one skilled in the art that the present solution may be practiced without these specific details.

A customer premises equipment (CPE) device includes, in a preferred embodiment, a controller, e.g. a microprocessor, a non-volatile memory, in which an operating system is stored, a volatile memory for the operation of the CPE device, a Wi-Fi node for a wireless operation and a broadband connection, e.g. an xDSL connection. A CPE device of this kind is, for example, a residential gateway, which has a central position within a wireless local area network (WLAN).

Figure 1:
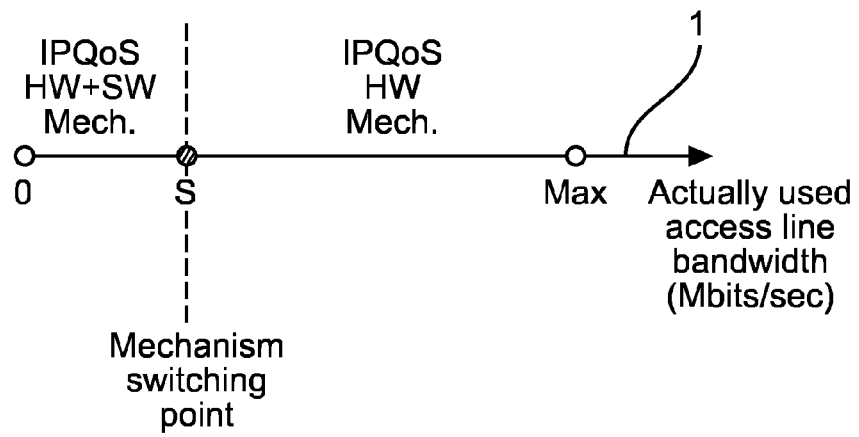
FIG. 1 a method for an automatic selection of an IP QoS mechanism.

A principle method for an automatic selection of an IP QoS mechanism for upstream traffic on the high bandwidth access line is shown in FIG. 1: Depending on the rate of the actually used upstream bandwidth 1 of the access line, only a QoS hardware mechanism (HW Mech) is used, or a QoS software mechanism (SW Mech) and the hardware mechanism are used.

When the actually used bandwidth of the access line, e.g. an xDSL connection, goes above a threshold of S Mbits/s, the IPQoS SW mechanism is stopped, and the IPQoS HW mechanism remains. When the actually used bandwidth goes below S Mbits/s, the IPQoS SW mechanism is started, in addition to the IPQoS HW mechanism, allowing more priority queues, supporting a refinement of QoS categories. The threshold of S Mbits/s is below the maximum synchronization rate Max of the access line.

The threshold S is for example 10 Mbit/s. Above 10 Mbit/s, the software mechanism is disabled, and below 10 Mbit/s, the software mechanism allowing software queuing is enabled.

Figure 2:
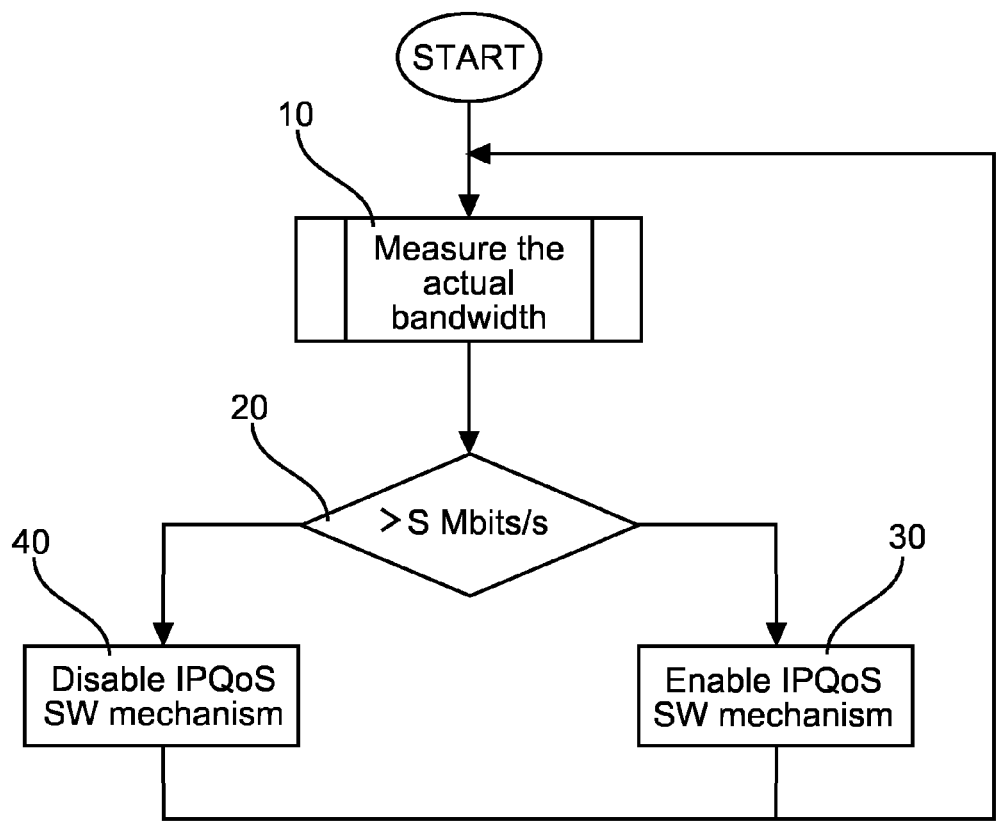
FIG. 2 a flowchart illustrating the switching mechanism of the method of FIG. 1, and FIG. 3 a preferred embodiment for an automatic selection of an IP QoS mechanism.

A flowchart showing the concept of the switching mechanism is shown in FIG. 2. During operation of the CPE device, the actually used upstream bandwidth is measured, step 10. The measured bandwidth is then compared with the threshold S, step 20: If the measured bandwidth is above S Mbit/s, software queuing is disabled, step 30. If the measured bandwidth is below 10 Mbit/s, software queuing is enabled, step 40. The procedure continues after steps 30 and 40 with step 10, measuring again the actually used bandwidth, and so on, providing therefore a closed loop for the method.

Figure 3:
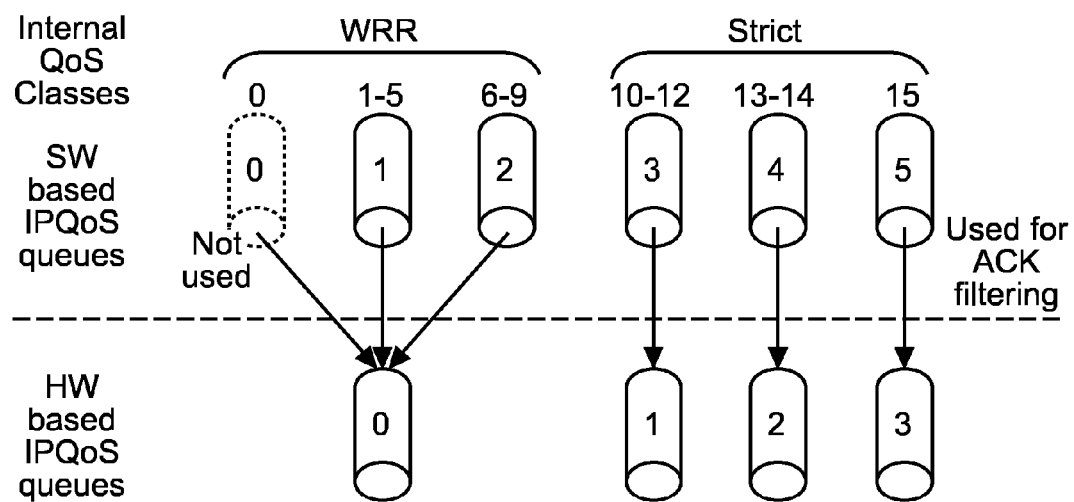

For a particular embodiment, the mapping between the pure hardware queuing and the hardware and software queuing is designed as shown in FIG. 3. Any other mappings are also envisioned with this invention. In this embodiment, quality of service classes 0-15 are provisioned in the CPE device. The lowest priority, class 0, is not used. The highest priority, class 15, is used for acknowledgement (ACK) filtering. The quality of service classes 0-9 are combined into software based QoS queues 0-2 and the quality of service classes 10-15 are combined into software based QoS queues 3-5, as depicted in FIG. 3.

When the software based QoS mechanism is enabled, for the queues 0-2 a weighted round robin (WRR) priority queuing and for the queues 3-5 a strict priority queuing is provided. When the software based QoS mechanism is disabled, the queues 0-2 as used for the weighted round robin (WRR) priority queuing are combined and assigned to a single queue, queue 0. The queues 3-5 as used with the software based QoS mechanism remain and are renumbered to 1-3. Now, only strict priority queuing is provided for the remaining queues 0-3, when only the hardware based QoS mechanism is enabled.

The solution has the following advantages: It is possible to deploy the software for customers that need this software queuing mechanism customized build. The solution will sense the upstream rate, for example of the VDSL line, and decide to disable the IPQoS software module when needed. The customer doesn't need to manage different releases for matching different VDSL profiles.

Also other embodiments of the invention may be utilized by one skilled in the art without departing from the scope of the present invention. The invention is in particular not limited to a VDSL broadband connection. The invention resides therefore in the claims herein after appended.

The invention claimed is:

1. A method, comprising
measuring an upstream rate and depending on the upstream rate, keeping a software queuing mechanism enabled in case of the upstream rate below a threshold, and using a hardware queuing mechanism in case of the upstream rate above the threshold.

2. The method of claim 1, comprising enabling the hardware queuing mechanism up to a maximum synchronization rate (Max), and enabling the software queuing mechanism only up to the threshold.

3. The method of claim 1, wherein the method is implemented in an automatic configuration script.

4. The method of claim 1, wherein the method is implemented in a generic CPE software.

5. The method of claim 1, applied to an xDSL line.

6. The method of claim 5, wherein the xDSL line is a VDSL line.

7. The method of claim 1, comprising using a weighted round robin (WRR) priority queuing and a strict priority queuing when the software queuing mechanism is enabled, and disabling the weighted round robin (WRR) priority queuing, when the software queuing mechanism is disabled.

8. The method of claim 7, comprising combining the queues, as used for the weighted round robin priority queuing, into one queue, when the software queuing mechanism is disabled.

9. A non-transitory computer readable storage medium having stored therein instructions enabling a microprocessor to
measure an upstream rate,
keep a software queuing mechanism enabled in case of the upstream rate below a threshold, and
use a hardware queuing mechanism in case of the upstream rate above the threshold.

10. A device comprising a microprocessor configured to measure an upstream rate,
keep a software queuing mechanism enabled in case of the upstream rate below a threshold, and
use a hardware queuing mechanism in case of the upstream rate above the threshold.

11. The device of claim 10, wherein the device belongs to a set comprising a residential gateway, an enterprise gateway, a router, a switch, and a set-top box.

12. The device of claim 10, wherein the microprocessor is further configured to enable the hardware queuing mechanism up to a maximum synchronization rate (Max), and to enable the software queuing mechanism only up to the threshold.

13. The device of claim 10, operating on a xDSL line.

14. The device of claim 10, wherein the microprocessor is further configured to use a weighted round robin (WRR) priority queuing and a strict priority queuing when the software queuing mechanism is enabled, and to disable the weighted round robin (WRR) priority queuing, when the software queuing mechanism is disabled.

15. The device of claim 14, wherein the microprocessor is further configured to combine the queues, as used for the weighted round robin priority queuing, into one queue, when the software queuing mechanism is disabled.

* * * * *